United States Patent
Mueller et al.

(10) Patent No.: US 10,421,135 B2
(45) Date of Patent: Sep. 24, 2019

(54) ROTARY CUTTING TOOL WITH COOLANT PASSAGES AND METHOD OF MAKING SAME

(71) Applicant: Kennametal Inc., Latrobe, PA (US)

(72) Inventors: Thilo Klaus Juergen Mueller, Herzogenurach (DE); Naveen Kumar Kondameedi, Murrysville, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/802,813

(22) Filed: Nov. 3, 2017

(65) Prior Publication Data
US 2019/0134723 A1    May 9, 2019

(51) Int. Cl.
*B23C 5/28*    (2006.01)
*B23P 15/34*   (2006.01)
*B23C 5/10*    (2006.01)

(52) U.S. Cl.
CPC ............. *B23C 5/28* (2013.01); *B23C 5/10* (2013.01); *B23P 15/34* (2013.01); *B23C 2250/12* (2013.01)

(58) Field of Classification Search
CPC .... B23G 5/005; B23G 2200/22; B23B 51/06; B23B 27/10; B23D 77/006; B23C 5/28; B23C 5/10; B23C 2250/12; B23Q 11/10
See application file for complete search history.

(56) References Cited

U.S. PATENT DOCUMENTS

| | | | | |
|---|---|---|---|---|
| 960,526 | A * | 6/1910 | Erlandsen | B23B 27/10 |
| | | | | 144/230 |
| 3,037,264 | A * | 6/1962 | Mossberg | B23C 5/10 |
| | | | | 407/11 |
| 5,733,076 | A | 3/1998 | Basteck | |
| 6,045,301 | A | 4/2000 | Kammermeier et al. | |
| 6,116,825 | A * | 9/2000 | Kammermeier | B23B 51/06 |
| | | | | 279/20 |
| 9,227,253 | B1 * | 1/2016 | Swift | B23C 5/28 |
| 9,895,755 | B2 | 2/2018 | Kondameedi et al. | |
| 9,975,182 | B2 * | 5/2018 | Stoyanov | B23B 27/14 |
| 2004/0131434 | A1 | 7/2004 | Giessler | |
| 2010/0272531 | A1 * | 10/2010 | Shavit | B21C 23/147 |
| | | | | 408/59 |

(Continued)

FOREIGN PATENT DOCUMENTS

| | | |
|---|---|---|
| JP | 8-290320 A2 | 11/1996 |
| JP | 9-019821 A2 | 1/1997 |

(Continued)

*Primary Examiner* — Willmon Fridie, Jr.
(74) *Attorney, Agent, or Firm* — Matthew S. Bedsole (57) ABSTRACT

A method of manufacturing a rotary cutting tool is described. The rotary cutting tool defines a central longitudinal axis and includes a shank portion and a cutting portion adjoining the shank portion. The shank portion has a shank end and the cutting portion has a cutting end opposite the shank end. One or more blades are separated by a flute. A main, internal coolant passage extends from the shank end, through the shank portion, and into the cutting portion. The method includes forming at least one secondary coolant passage in fluid communication with the main, internal coolant passage in which the at least one secondary coolant passage is formed by using electro-magnetic radiation.

20 Claims, 12 Drawing Sheets

(56) References Cited

U.S. PATENT DOCUMENTS

| | | | |
|---|---|---|---|
| 2013/0115017 A1* | 5/2013 | Schanz | B23D 77/00 407/11 |
| 2014/0205389 A1* | 7/2014 | Azegami | B23C 5/10 407/46 |
| 2015/0110567 A1* | 4/2015 | Ning | B23D 77/006 408/59 |
| 2015/0231736 A1 | 8/2015 | Kondameedi | |
| 2015/0306685 A1* | 10/2015 | Rakes | B24D 5/02 407/11 |
| 2015/0360302 A1* | 12/2015 | Guter | B23B 51/06 408/59 |
| 2016/0158855 A1* | 6/2016 | Kondameedi | B23P 15/34 407/11 |
| 2016/0214187 A1* | 7/2016 | Fukata | B23C 5/10 |
| 2016/0228955 A1* | 8/2016 | Leirer | B23C 5/10 |
| 2016/0263666 A1* | 9/2016 | Myers | B23B 51/06 |
| 2018/0093330 A1 | 4/2018 | Guter et al. | |

FOREIGN PATENT DOCUMENTS

| | | |
|---|---|---|
| JP | 9-19822 A2 | 1/1997 |
| JP | 9-019823 A2 | 1/1997 |
| JP | 2000-190122 A2 | 7/2000 |
| JP | 2011-200940 A2 | 10/2011 |
| JP | 2012-200836 A2 | 10/2012 |
| JP | 2013-193159 A2 | 9/2013 |
| WO | 2013/121993 A1 | 8/2013 |
| WO | 2103/137021 A1 | 9/2013 |
| WO | WO2013137021 | 9/2013 |
| WO | 2014/069265 A1 | 5/2014 |

* cited by examiner

ROTARY CUTTING TOOL WITH COOLANT PASSAGES AND METHOD OF MAKING SAME

BACKGROUND OF THE INVENTION

Field of the Invention

The invention relates to cutting tools, and in particular to a method of making coolant passages in a rotary cutting tool using electro-magnetic radiation.

Description of Related Art

Electrical discharge machining (or EDM) is a machining method primarily used for hard metals or those that would be impossible to machine with traditional techniques. One critical limitation, however, is that EDM only works with materials that are electrically conductive. EDM can cut small or odd-shaped angles, intricate contours or cavities in extremely hard steel and exotic metals, such as Titanium, Hastelloy, Kovar, Inconel and carbide.

Sometimes referred to as spark machining or spark eroding, EDM is a nontraditional method of removing material by a series of rapidly recurring electric arcing discharges between an electrode (the cutting tool) and the work piece, in the presence of an energetic electric field (applied potential). The EDM cutting tool is guided along the desired path very close to the workpiece, but it does not touch the workpiece. Consecutive sparks produce a series of microcraters on the work piece and remove material along the cutting path by melting and vaporization. The particles are washed away by the continuously flushing dielectric fluid.

Electro Chemical Machining (or ECM) is a method of working extremely hard materials or materials that are difficult to machine cleanly using conventional methods. It is limited, however, to electrically conductive materials. ECM can cut small or odd-shaped angles, intricate contours or cavities in extremely hard steel and exotic metals, such as Titanium, Hastelloy, Kovar and Inconel.

ECM is similar in concept to EDM in that a high current is passed between an electrode and the part and through an electrolyte. While the applied potential in EDM ranges from 20 to 200V, the applied potential in ECM is lower and ranges from a few mV to about 30V. The ECM cutting tool is guided along the desired path very close to the work but it does not touch the workpiece. Unlike EDM however, no sparks are created. The workpiece is corroded away by the electro-chemical reaction occurring at the surface of the workpiece. Very high metal removal rates are possible with ECM, along with no thermal or mechanical stresses being transferred to the part, and mirror surface finishes are possible. The ECM process is most widely used to produce complicated shapes with good surface finish in difficult to machine materials, such as turbine blades. It is also widely used as a deburring process.

Both the ECM and EDM processes use electrical current under direct-current (DC) voltage to electrically power removal of the material from the workpiece. In ECM, an electrically conductive liquid or electrolyte is circulated between the electrodes and the workpiece for permitting electrochemical dissolution of the workpiece material, as well as cooling and flushing the gap region therebetween. In EDM, a nonconductive liquid or dielectric is circulated between the cathode and workpiece to permit electrical discharges in the gap therebetween for removing the workpiece material.

In both ECM and EDM the corresponding electrodes thereof are typically mounted in multi-axis NC machines for achieving the precise 3D feed path required thereof for machining complex 3D workpieces, such as the airfoils of blades and vanes. The NC machines include digitally programmable computers and include suitable software, which controls all operation, including the feed path and the separate ECM and EDM processes.

Electrical arcing during the ECM or EDM processes can result in a relatively large recast layer or heat affected zone (HAZ) on the machined workpiece, such as a cutting tool, in which the material properties can be undesirably degraded. Specifically, electrical arcing during the ECM or EDM processes can result in a relatively large recast layer or heat affected zone (HAZ) on the machined workpiece in which the material properties can be undesirably degraded. Thus, in both processes, electrical arcing between the ECM or EDM electrodes and the workpiece, such as a cutting tool, must be prevented to prevent undesirable heat damage to the cutting tool.

Accordingly, it is desirable to provide a method of making coolant passages in a cutting tool without undesirable damage to the material properties of the cutting tool.

SUMMARY OF THE INVENTION

The problem of preventing or minimizing undesirable damage during manufacturing of coolant passages in a cutting tool, such as a solid end mill, and the like, is solved by using electro-magnetic energy to manufacture the coolant passages.

In one aspect of the invention, a rotary cutting tool defines a central longitudinal axis and comprises a shank portion, a cutting portion adjoining the shank portion, the shank portion has a shank end, the cutting portion has a cutting end opposite the shank end, one or more blades separated by a flute, and a main, internal coolant passage extending from the shank end through the shank portion and into the cutting portion. The method comprises forming at least one secondary coolant passage in fluid communication with the main, internal coolant passage, wherein the secondary coolant passage is formed by using electro-magnetic radiation.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

In the present description of non-limiting embodiments and in the claims, other than in the operating examples or where otherwise indicated, all numbers expressing quantities or characteristics of ingredients and products, processing conditions, and the like are to be understood as being modified in all instances by the term "about" to reflect the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

Accordingly, unless indicated to the contrary, any numerical parameters set forth in the following description and the attached claims are approximations that may vary depending upon the desired properties one seeks to obtain in the apparatus and methods according to the present disclosure. At the very least, and not as an attempt to limit the application of the doctrine of equivalents to the scope of the claims, each numerical parameter should at least be construed in light of the number of reported significant digits and by applying ordinary rounding techniques.

Referring to the drawings, there should be an appreciation that the rotary cutting tool of the invention can operate in a number of different applications. Accordingly, the description herein of specific applications should not be a limitation on the scope and extent of the use of the rotary cutting tool.

The rotary cutting tool, which has internal coolant delivery, is for use in the removal of material from a workpiece. In this respect, the rotary cutting tool is for use in a material removal operation, wherein there is enhanced delivery of coolant adjacent the interface between the rotary cutting tool and the workpiece (i.e., the cutting tool-chip interface) to diminish excessive heat at the cutting edge-chip interface.

The enhanced delivery of coolant to the cutting edge-chip interface leads to certain advantages. For example, enhanced delivery of coolant to the cutting edge-chip interface results in enhanced lubrication at the cutting edge-chip interface, which decreases the tendency of the chip to stick to the rotary cutting tool. Further, enhanced flow of coolant to the cutting edge-chip interface leads to better evacuation of chips from the vicinity of the interface with a consequent reduction in the potential to re-cut a chip.

There should also be an appreciation that the interior coolant passage discharge has an orientation, whereby the coolant impinges beneath the chip surface. Such an orientation of the coolant enhances the cooling properties, which enhances the overall performance of the rotary cutting tool.

In the material removal operation, the rotary cutting tool of the invention engages a workpiece to remove material from a workpiece typically in the form of chips. A material removal operation that removes material from the workpiece in the form of chips typically is known by those skilled in the art as a chipforming material removal operation. The book *Machine Shop Practice* [Industrial Press Inc., New York, N.Y. (1981)] by Moltrecht presents at pages 199-204 a description, inter alia, of chip formation, as well as different kinds of chips (i.e., continuous chip, discontinuous chip, segmental chip). Moltrecht reads [in part] at pages 199-200, "When the cutting tool first makes contact with the metal, it compresses the metal ahead of the cutting edge. As the tool advances, the metal ahead of the cutting edge is stressed to the point where it will shear internally, causing the grains of the metal to deform and to flow plastically along a plane called the shear plane . . . When the type of metal being cut is ductile, such as steel, the chip will come off in a continuous ribbon . . . ". Moltrecht goes on to describe formation of a discontinuous chip and a segmented chip.

As another example, the text found at pages 302-315 of the *ASTE Tool Engineers Handbook*, McGraw Hill Book Co., New York, N.Y. (1949) provides a lengthy description of chip formation in the metal cutting process. At page 303, the ASTE Handbook makes the clear connection between chip formation and machining operations such as turning, milling and drilling. The following patent documents discuss the formation of chips in a material removal operation:

U.S. Pat. No. 5,709,907 to Battaglia et al. (assigned to Kennametal Inc.), U.S. Pat. No. 5,722,803 to Battaglia et al. (assigned to Kennametal Inc.), and U.S. Pat. No. 6,161,990 to Oles et al. (assigned to Kennametal Inc.).

Referring to FIGS. 1-6, a rotary cutting tool, generally designated as 10, is shown according to an embodiment of the invention. Although in the illustrated embodiment, the rotary cutting tool 10 comprises a solid end mill, the principles of the invention described below can be applied to other rotary cutting tools, such as solid drills, taps, reamers, and the like. In general, the solid end mill 10 defines a central longitudinal axis, A-A, and comprises a shank portion 12 for securing the end mill 10 in a chuck or arbor of a machine tool (not shown) and a cutting portion 14 adjoining the shank portion 12.

Figure 1:
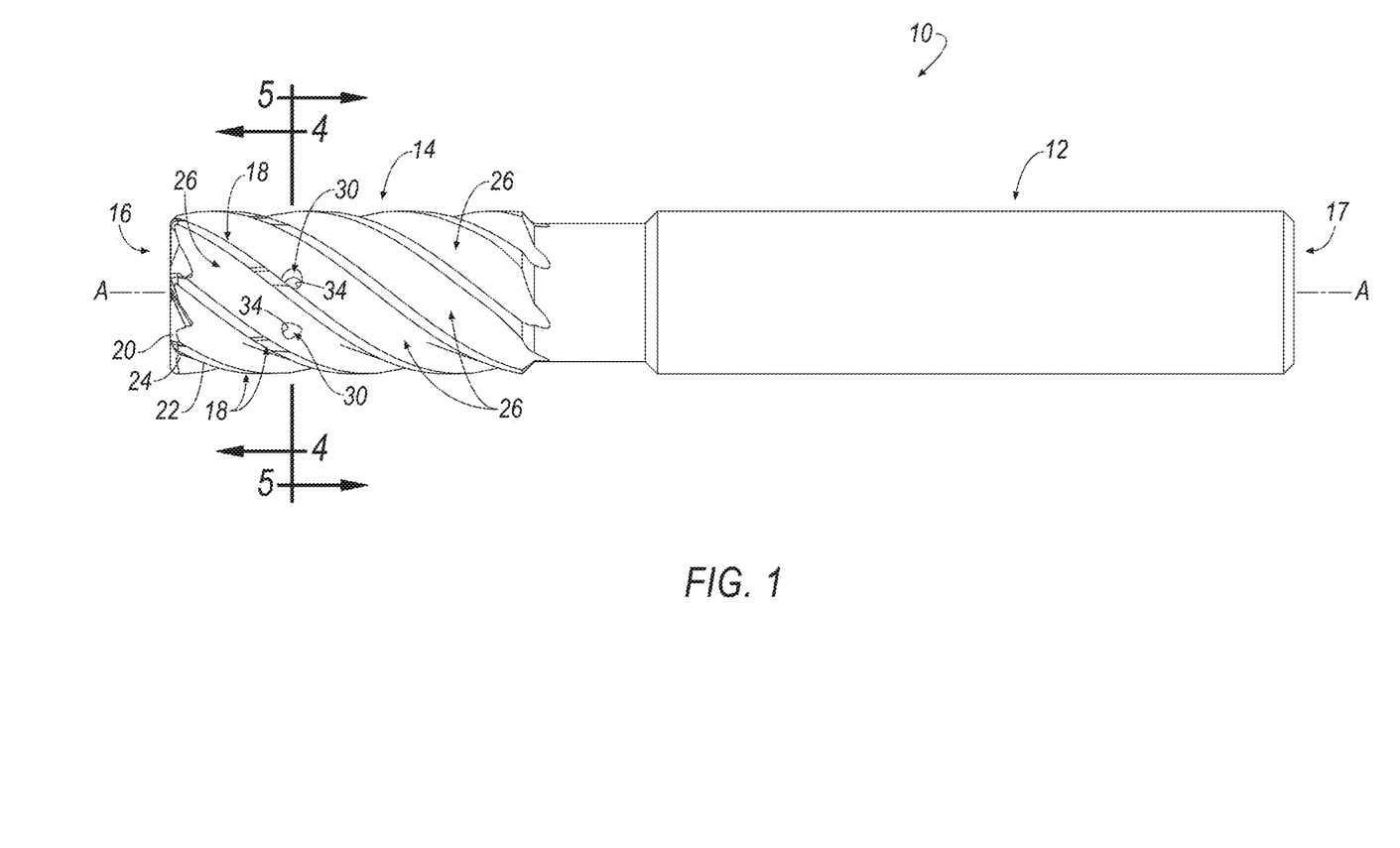
FIG. 1 is a side view of a rotary cutting tool with an internal coolant passage and a plurality of secondary coolant passages according to an embodiment of the invention.

The rotary cutting tool 10 may be made from one of any number of materials that are suitable for use as a rotary cutting tool. The following materials are exemplary materials useful for a rotary cutting tool: tool steels, cemented carbides, and Superhard material, such as Cubic Boron Nitride (CBN), Polycrystalline Cubic Boron Nitride (PCBN), Polycrystalline Diamonds (PCD), tungsten carbide (WC), cermet, ceramic, and the like. The specific materials and combinations of materials depend upon the specific application for the rotary cutting tool 10.

Figure 3:
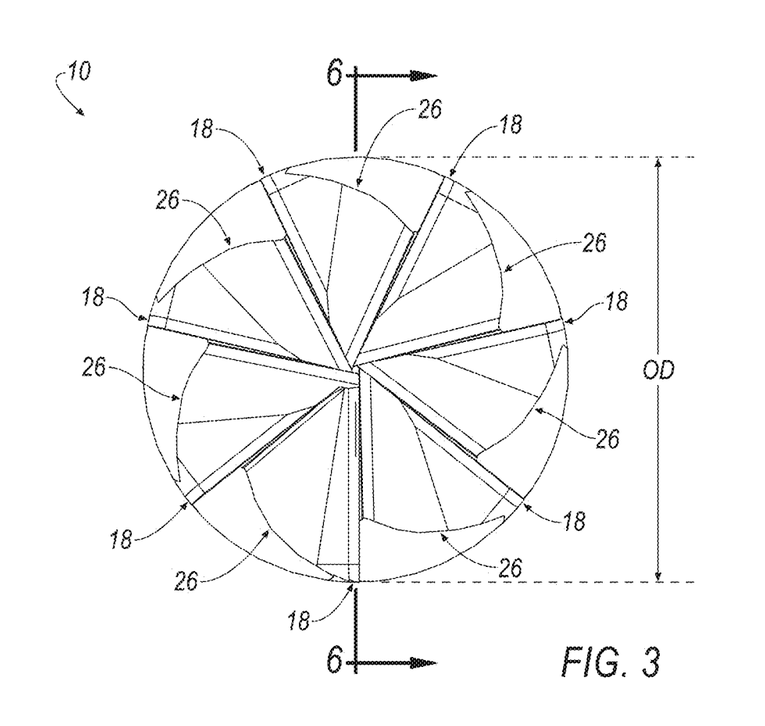
FIG. 3 is an end view of the rotary cutting tool of FIG. 1.
Figure 4:
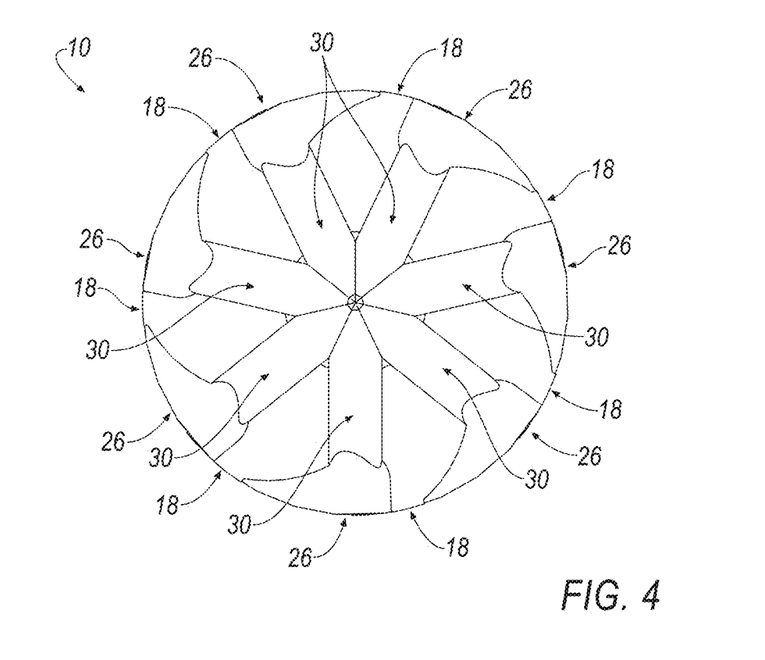
FIG. 4 is a cross-sectional view of the rotary cutting tool taken along line 4-4 of FIG. 1.

The cutting portion 14 has a cutting end 16, and the shank portion 12 has a shank end 17 opposite the cutting end 16. The rotary cutting tool 10 further comprising one or more blades 18. Each blade 18 has an end cutting edge 20 and a peripheral cutting edge 22. The end cutting edge 20 of each blade 18 extends from an outer diameter, OD, of the cutting portion 14 towards the central, longitudinal axis, A-A. The end cutting edge 20 of each blade 18 defines a first dish profile and a first axial profile. A "dish profile," as described herein, refers to the profile or shape of an end cutting portion of the blade 18 when viewed a side of the solid end mill 10, as in FIG. 1. An "axial profile," as described herein, refers to the profile of the end cutting portion of the blade 18 when viewed from an end, as shown in FIG. 3. In the illustrated embodiment, each blade 18 extends less than the full distance from the outer diameter, OD, to the central longitudinal axis, A-A. However, it will be appreciated that in an alternate embodiment, each blade 18 can extend from the outer diameter, OD, to the central longitudinal axis, A-A.

Embodiments of rotary cutting tool 10 described herein are not limited to the number of blades 18. One of skill in the art would readily understand that rotary cutting tools consistent with the present invention may include any number of blades. In the illustrated embodiment, for example, the rotary cutting tool 10 includes seven (7) blades 18. However, it will be appreciated that the invention can be practiced with any desired number of blades 18, depending on the dimensions of the rotary cutting tool 10.

In embodiments having two or more blades 18, various configurations and architectures of the first blade 18 and the second blade 18 are possible within the scope of the present invention. For example, in some embodiments, the first dish profile and the second dish profile are reflectively symmetric. Further, in some embodiments, the first dish profile and the second dish profile together form a convex curve. Alternatively, in some embodiments, the first dish profile and the second dish profile together form a concave curve. It is to be understood that such arrangements in which opposite dish profiles, when together, may form a concave or convex dish overall, that a dish profile of individual teeth or cutting edges is to be convex. In any of such arrangements, a radially innermost portion of dish profiles described herein is axially rearward of at least one other point along the same dish profile. Such an arrangement permits the necessary clearance at the radially innermost portion (or, in some cases, the center of the end face of the tool) such that cutting tools described herein are capable of ramping operations.

In some embodiments, the first axial profile and the second profile are rotationally asymmetric. Alternatively, in some embodiments, the first axial profile and the second axial profile are rotationally symmetric. It is to be understood that in such embodiments, the first dish profile and the second dish profile are still reflectively symmetric.

In some embodiments, each blade 18 defines a rounded corner cutting edge 24 connecting the end cutting edge 20 and the peripheral cutting edge 22 of each blade 18, the rounded corner cutting edge 24 defining a rounded corner radius. It will be appreciated that the invention can be practiced with other types of corner cutting edges. For example, the corner cutting edge 24 can be chamfered corner cutting edge, a sharp corner cutting edge, and the like.

Figure 2:
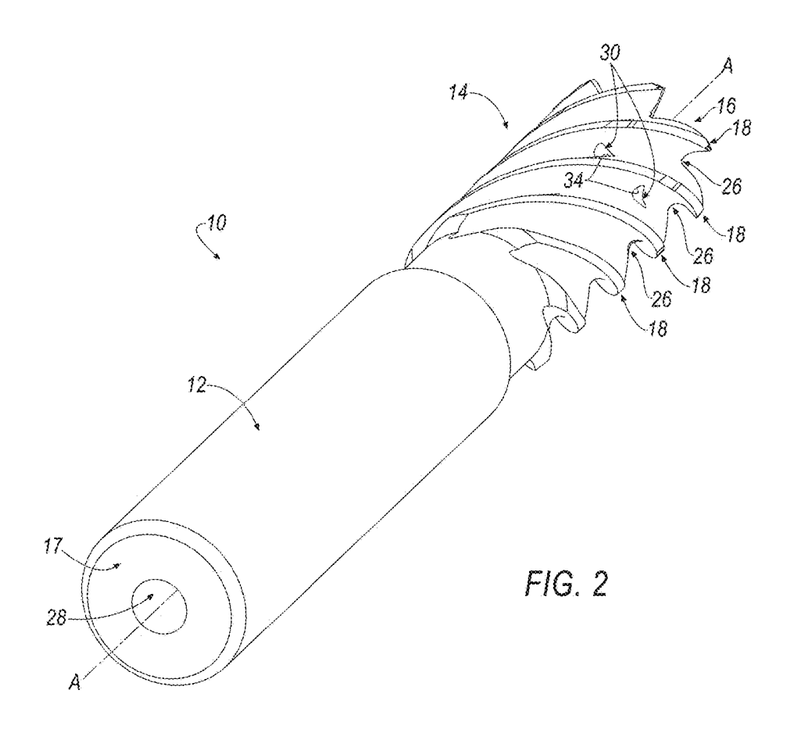
FIG. 2 is a rear isometric view of the rotary cutting tool of FIG. 1.

Referring now to FIGS. 1 and 2, each blade 18 is separated by a flute 26 extending axially rearward from the cutting end 16 of the cutting head 14. The flute 26 can be straight or helical. The number of flutes 26 is equal to the number of blades 18. In the illustrated embodiment, the cutting head 14 has a total of seven (7) flutes 26. However, it will be appreciated that the invention can be practiced with any desirable number of flutes 26, depending on the dimensions of the rotary cutting tool 10. For example, a rotary cutting tool 10 having a relatively large outer diameter, OD, has the capability of having a greater number of flutes 24 than a rotary cutting tool with a relatively smaller outer diameter, OD, and vice versa. Thus, the rotary cutting tool 10 can have as few as one flute 26 to as many as thirty or more flutes 26, and an outer diameter, OD, between about 6 mm and about 35 mm.

One aspect of the invention is that the rotary cutting tool 10 includes a main, internal coolant passage 28 that extends from the shank end 17 toward the cutting end 16 through the shank portion 12 and into the cutting portion 14 of the rotary cutting tool 10. The main coolant passage 28 is in fluid communication with a source of pressurized coolant (not shown) when the rotary cutting tool 10 is in use. In one embodiment, the main coolant passage 28 is centrally located and lies along the central, longitudinal axis, A-A, of the rotary cutting tool 10. It will be appreciated that the invention is not limited by the number of main and secondary coolant passages 28, 30, and that the invention can be practiced with any desirable number of coolant passages for providing a sufficient coolant flow rate to the rotary cutting tool 10.

In addition, there should be an appreciation that any one of a number of different kinds of fluid or coolant are suitable for use in the rotary cutting tool 10. Broadly speaking, there are two basic categories of fluids or coolants; namely, oil-based fluids which include straight oils and soluble oils, and chemical fluids which include synthetic and semisynthetic coolants. Straight oils are composed of a base mineral or petroleum oil and often contain polar lubricants such as fats, vegetable oils, and esters, as well as extreme pressure additives of chlorine, sulfur and phosphorus. Soluble oils (also called emulsion fluid) are composed of a base of petroleum or mineral oil combined with emulsifiers and blending agents Petroleum or mineral oil combined with emulsifiers and blending agents are basic components of soluble oils (also called emulsifiable oils). The concentration of listed components in their water mixture is usually between 30-85%. Usually the soaps, wetting agents, and couplers are used as emulsifiers, and their basic role is to reduce the surface tension. As a result, they can cause a fluid tendency to foam. In addition, soluble oils can contain oiliness agents such as ester, extreme pressure additives, alkanolamines to provide reserve alkalinity, a biocide such as triazine or oxazolidene, a defoamer, such as a long chain organic fatty alcohol or salt, corrosion inhibitors, antioxidants, etc. Synthetic fluids (chemical fluids) can be further categorized into two subgroups: true solutions and surface-active fluids. True solution fluids are composed essentially of alkaline inorganic and organic compounds and are formulated to impart corrosion protection to water. Chemical surface-active fluids are composed of alkaline inorganic and organic corrosion inhibitors combined with anionic non-ionic wetting agents to provide lubrication and improve wetting ability. Extreme-pressure lubricants based on chlorine, sulfur, and phosphorus, as well as some of the more recently developed polymer physical extreme-pressure agents can be additionally incorporated in these fluids. Semisynthetics fluids (also called semi-chemical) contains a lower amount of refined base oil (5-30%) in the concentrate. They are additionally mixed with emulsifiers, as well as 30-50% of water. Since they include both constituents of synthetic and soluble oils, characteristics properties common to both synthetics and water-soluble oils are presented.

Coolant from a coolant source (not shown) enters the coolant passage 28 and travels through the rotary cutting tool 10 so to exit through one or more secondary coolant passages 30 in fluid communication with the internal coolant passage 28. The main internal coolant passage 28 can be formed using any conventional technique, such as drilling, and the like.

Another aspect of the invention is that the one or more secondary coolant passages 30 are formed using a laser beam technique (i.e., electro-magnetic radiation), rather than conventional EDM and ECM techniques. One advantage of using a laser beam technique is that the coolant passages 30 can be precisely formed with any desirable cross-sectional shape and diameter. For example, the coolant passages 30 can be circular in cross-sectional shape with a relatively small diameter of about 5 microns. In another example, the coolant passages 30 can be non-circular in cross-sectional shape with a relatively larger diameter of between about 10 microns to about 10 mm.

One laser beam technique to produce the secondary coolant passages 30 is known as Laser MicroJet® that is commercially available from SYNOVA located in Ecublens, Switzerland (www.synova.ch). In general, Laser MicroJet® technology combines a laser beam with a low-pressure, pure de-ionized and filtered water jet, which cools the cutting surface and offers extreme precision debris removal. Laser MicroJet® technology involves generating a water jet using small nozzles (20-160 μm) made of sapphire or diamond, and low water pressure (100-300 bar). The water jet is not involved in the cutting operation. A high-power pulsed laser beam is focused into a nozzle in a water chamber. Lasers are pulsed with a pulse duration in the micro- or nano-second range, for example, 10 fs to 1 millisecond, and operating at a frequency of 1064 nm (IR), 532 nm (Green), or 355 nm (UV). The laser beam is guided by total inter reflection at the water/air interface, in a manner similar to conventional glass fibers, to a disk of super hard material, such as Cubic Boron Nitride (CBN), Polycrystalline Diamonds (PCD), tungsten carbide (WC), and the like. Laser MicroJet® technology has a long working distance (>100 mm).

Another similar laser beam technique using laser ablation by encasing a laser beam in a water jet is commercially available from Avonisys AG located in Zug, Switzerland (http://www.avonisys.com).

Another laser beam technique is commercially available from GFH GmbH located in Deggenforf, Germany (www.gfh-gmbh.de). This laser beam technique uses a rotating telescope of cylindrical lenses that causes rotation of the laser beam to produce a laser beam that is substantially uniform in power density. As a result, this laser beam technique can produce positive conical bores in which the entrance diameter is larger than the outlet diameter, a cylindrical bore in which the entrance and outlet diameters are equal, or negative conical bores in which the entrance diameter is smaller than the outlet diameter. The resulting bores are free of burrs and have a roundness of +/−1%.

Another laser beam technique is to use a machine equipped with a galvanometer to machine the three-dimensional cavities that make the helical flute. However, a laser beam with a variety of energy intensity distribution profiles can be adapted to achieve the best topography in the three-dimensional cavity and the cutting edge. It should be appreciated that this technique is not limited to a Gaussian laser beam profile, and that the invention can be practiced using Top-Hat or Square intensity profiles.

Figure 5:
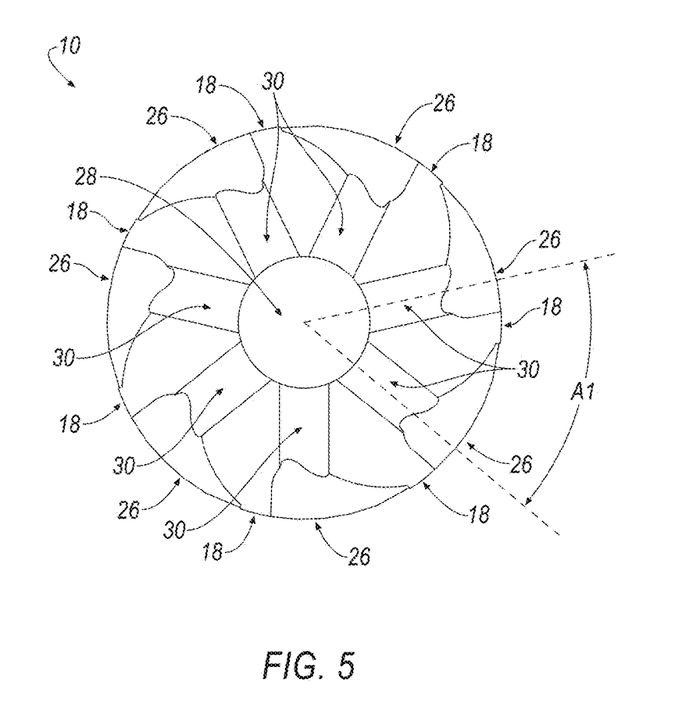
FIG. 5 is a cross-sectional view of the rotary cutting tool taken along line 5-5 of FIG. 1.
Figure 6:
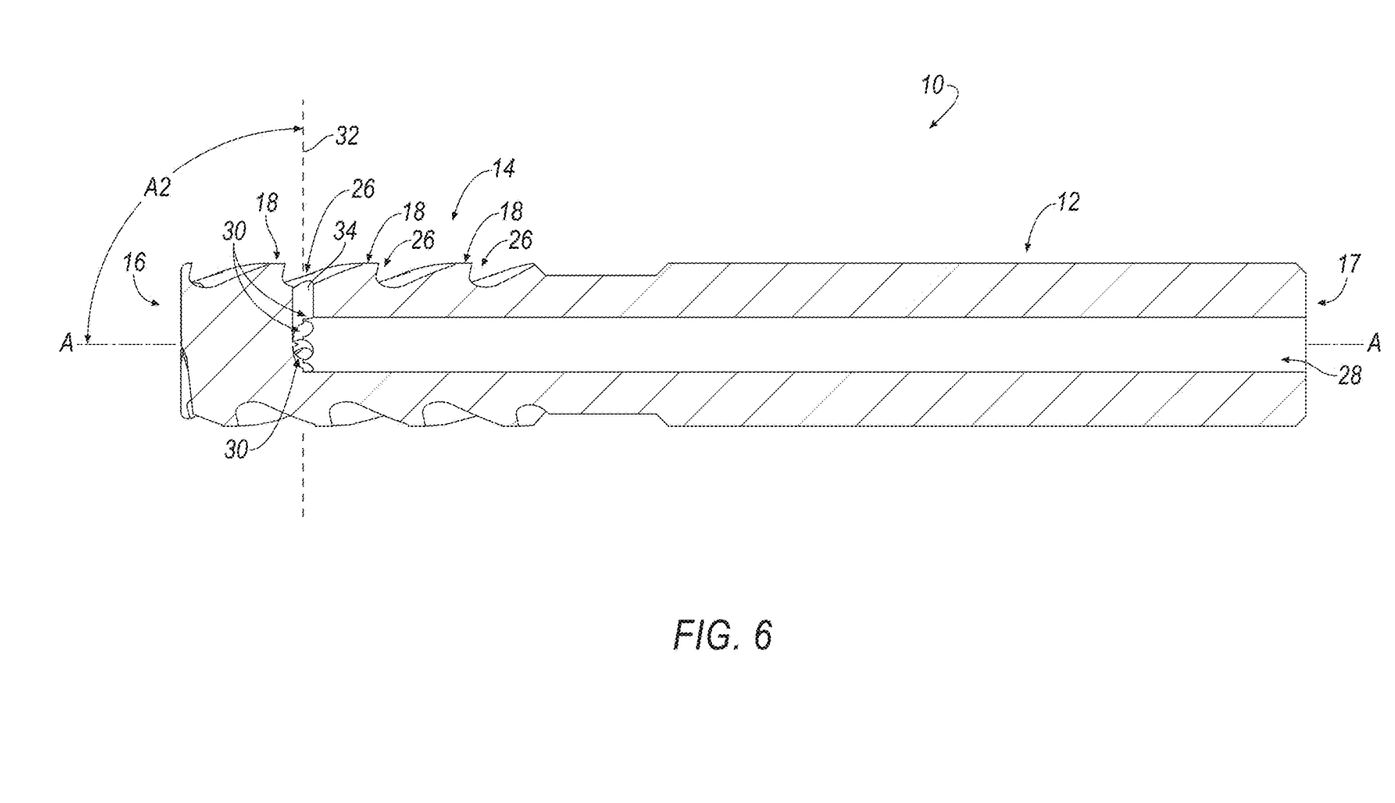
FIG. 6 is a cross-sectional view of the rotary cutting tool taken along line 6-6 of FIG. 3.
Figure 7:
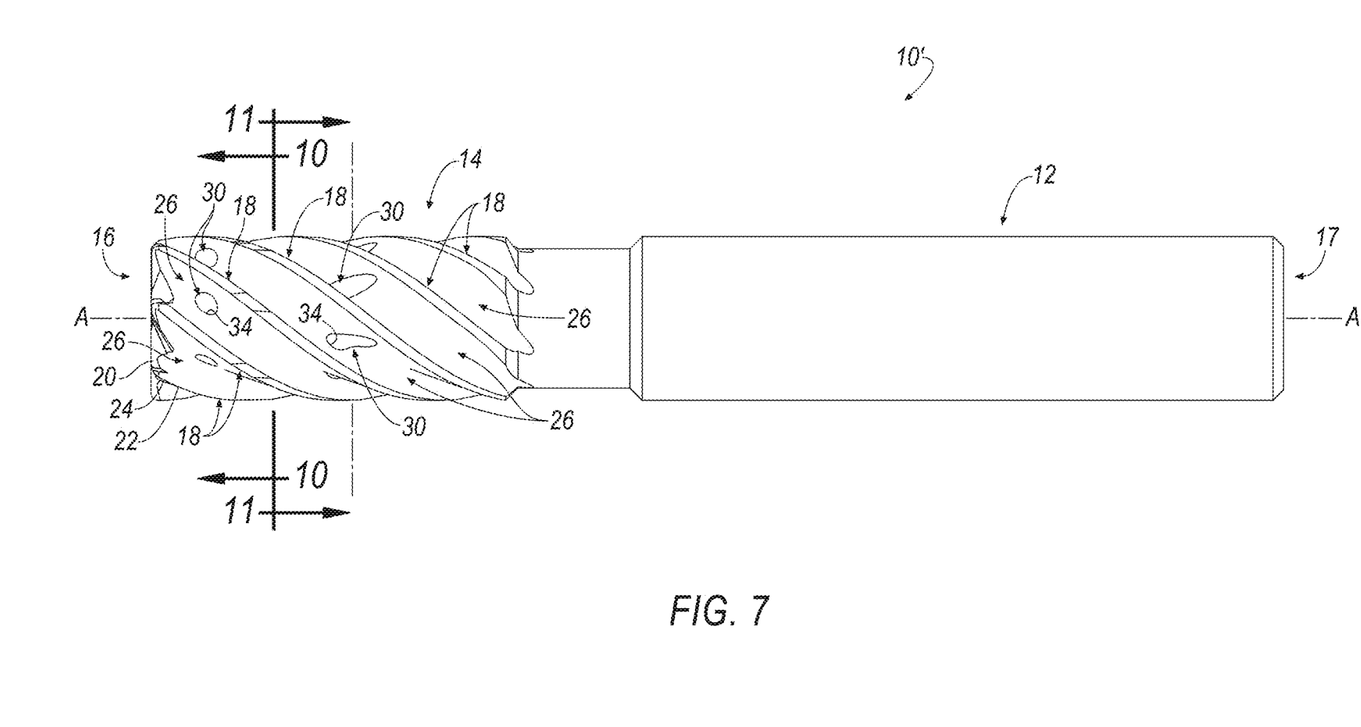
FIG. 7 is a side view of a rotary cutting tool with an internal coolant passage and a plurality of secondary coolant passages according to another embodiment of the invention.
Figure 8:
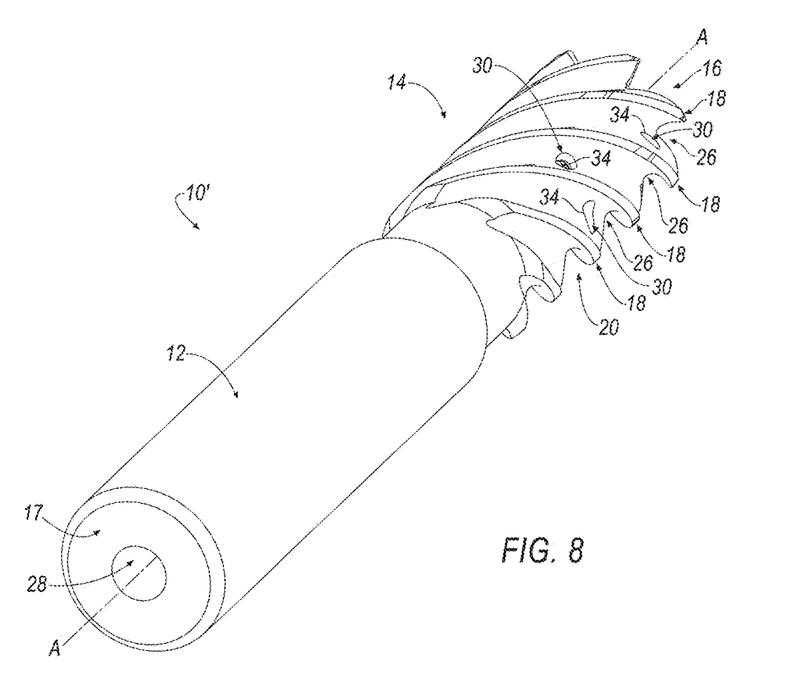
FIG. 8 is a rear isometric view of the rotary cutting tool of FIG. 7.
Figure 9:
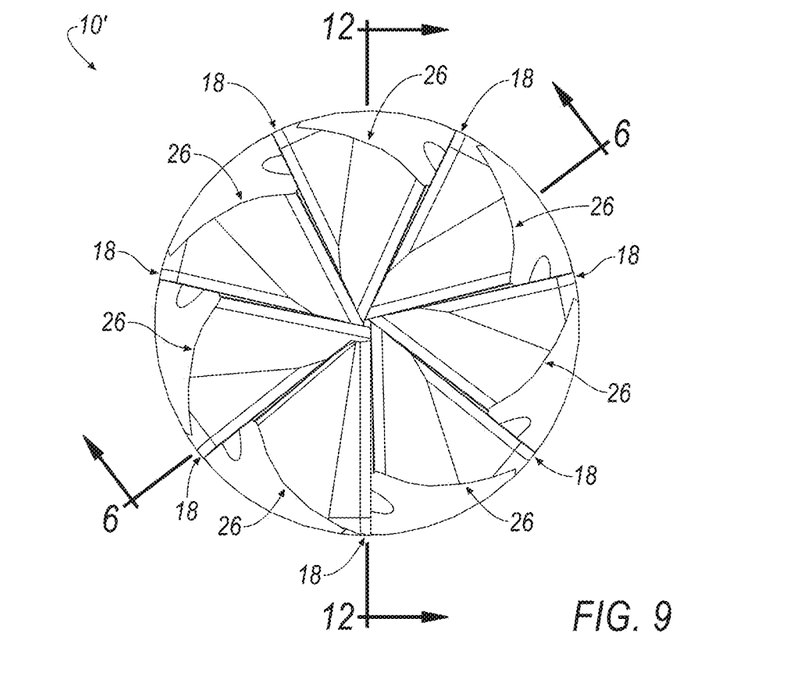
FIG. 9 is an end view of the rotary cutting tool of FIG. 7.
Figure 10:
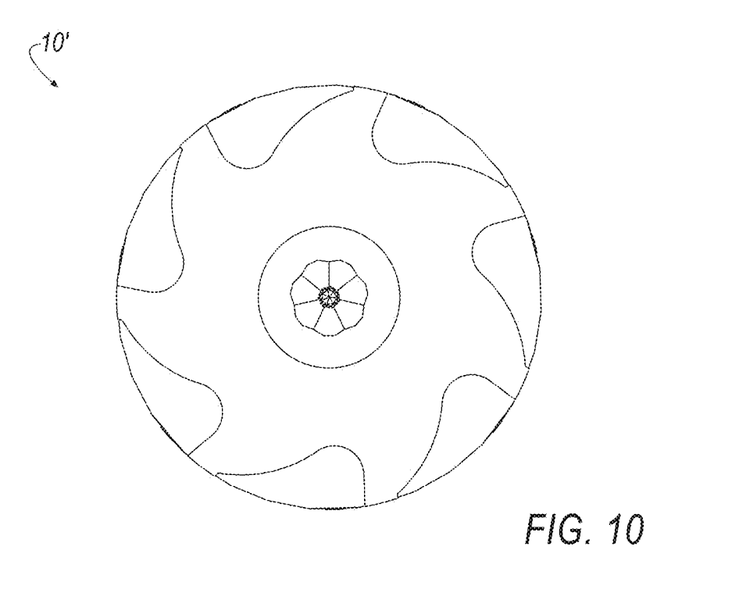
FIG. 10 is a cross-sectional view of the rotary cutting tool taken along line 10-10 of FIG. 7.
Figure 11:
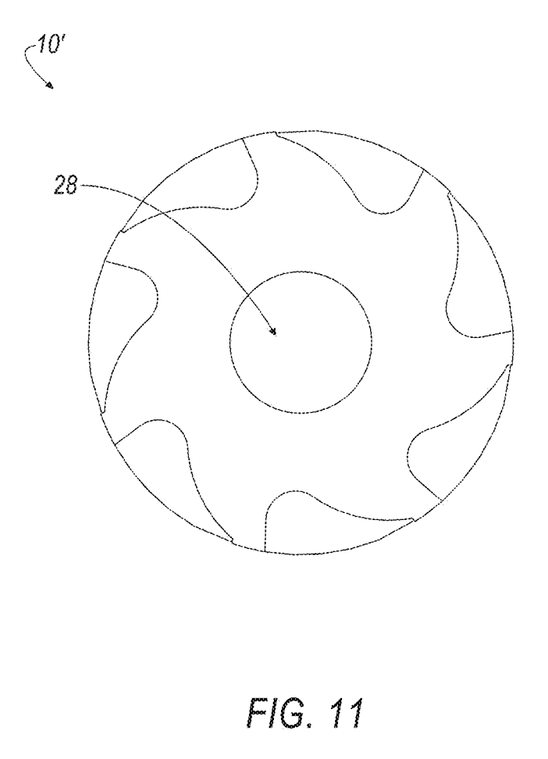
FIG. 11 is a cross-sectional view of the rotary cutting tool taken along line 11-11 of FIG. 7.
Figure 12:
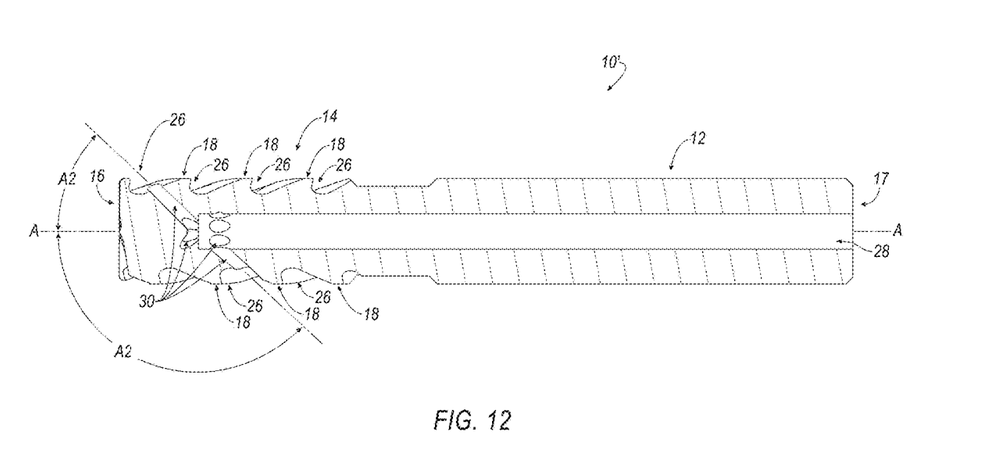
FIG. 12 is a cross-sectional view of the rotary cutting tool taken along line 12-12 of FIG. 9.

Referring now to FIGS. 1 and 6, each secondary coolant passage 30 has an exit aperture 34 located in a respective flute 26. Because there is a one-to-one correspondence between the number of flutes 26 and the number of secondary coolant passages 30, the illustrated embodiment has a total of seven (7) secondary coolant passages 30 that are separated from each other by an angle, A1, of about 51.428 (360 degrees/7), as shown in FIG. 5. Thus, in this embodiment, the secondary coolant passages 30 form a circular array of coolant passages that extend radially outward from the main, central coolant passage 28. It should be appreciated that the angle, A1, depends on the number of flutes 26. For example, the angle, A2, would be equal to about 72 degrees (360 degrees/5) for a rotary cutting tool having five (5) flutes.

In addition, each secondary coolant passage 30 is formed in a common plane 32 that is substantially perpendicular to the central, longitudinal axis, A-A. In other words, each secondary coolant passage 30 is formed at an angle, A2, of about 90 degrees with respect to the central, longitudinal axis, A-A.

It should be appreciated that the invention is not limited by the shape and location of the secondary coolant passages 30 in the rotary cutting tool 10, and that the invention can be practiced with the secondary coolant passages 30 having any desirable shape and location.

Referring now to FIGS. 7-12, a rotary cutting tool 10' is shown according to another embodiment of the invention. In this embodiment, the rotary cutting tool 10 includes one or more secondary coolant passages 30 formed at an angle, A2, with respect to the central, longitudinal axis, A-A. Specifically, the rotary cutting tool 10' may include one or more secondary coolant passages 30 extending from the main, internal coolant passage 28 in a forward direction (i.e., toward the cutting end 16) at an angle, A2, less than 90 degrees with respect to the central, longitudinal axis, A-A. In addition, the rotary cutting tool 10' may include one or more secondary coolant passages 30 extending from the main, internal coolant passage 28 in a rearward direction (i.e. away from the cutting end 16 or toward the shank end 17) at the angle, A2, of greater than 90 degrees with respect to the central, longitudinal axis, A-A. In addition, the rotary cutting tool 10' may include one or more secondary coolant passages 30 extending from the main, central coolant passage 28 at an angle, A2, equal to about 90 degrees with respect to the central, longitudinal axis, A-A. Thus, the rotary cutting tool 10' may include any combination of secondary coolant passages 30 that extend in a forward direction (i.e., less than 90 degrees), a rearward direction (i.e., greater than 90 degrees), and a substantially perpendicular direction (i.e., equal to 90 degrees) with respect to the central, longitudinal axis, A-A.

Figure 13:
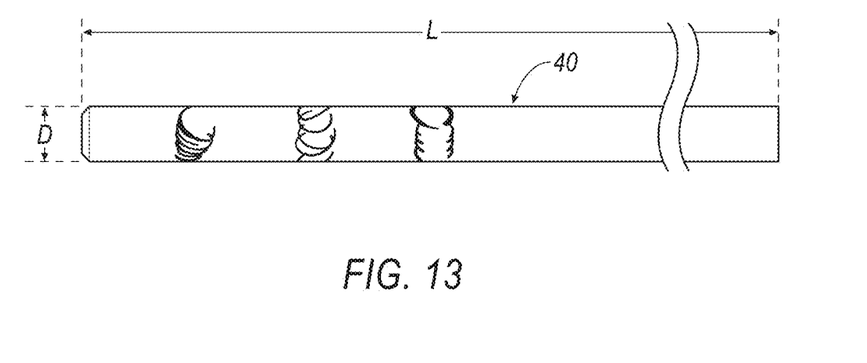
FIG. 13 is side view of a sacrificial rod according to an embodiment of the invention.

Referring now to FIG. 13, a sacrificial rod 40 is shown according to an embodiment of the invention. In general, the sacrificial rod 40 is generally cylindrical in shape having a diameter, D, and a length, L. The diameter, D, is slightly less than the diameter of the main, central coolant passage 28 of the rotary cutting tool 10 so as to enable the sacrificial rod 40 to be inserted into the main, central coolant passage 28. The length, L, of the sacrificial rod 40 is greater than the length of the rotary cutting tool 10 to enable the sacrificial rod 40 to be easily inserted and removed from the main, central coolant passage 28 of the rotary cutting tool 10. The purpose of the sacrificial rod 40 is to prevent the laser beam (i.e., electro-magnetic radiation) from penetrating through the main, central coolant passage 28 and impinging on the opposite surface of the main, central coolant passage 28 of the rotary cutting tool 10. The sacrificial rod 40 can be made of any suitable material to prevent the laser beam to easily penetrate therethrough, such as stainless steel (SS), hard steel, Alumina, ceramic, and the like.

As mentioned above, one laser beam technique to produce the secondary coolant passages 30 is known as Laser Micro-Jet® that is commercially available from SYNOVA located in Ecublens, Switzerland (www.synova.ch). In general, Laser MicroJet® technology combines a laser beam with a low-pressure, pure de-ionized and filtered water jet, which cools the cutting surface and offers extreme precision debris removal. Laser MicroJet® technology involves generating a water jet using small nozzles (20-160 μm) made of sapphire or diamond, and low water pressure (100-300 bar). A high-power pulsed laser beam is focused into a nozzle in a water chamber. Lasers are pulsed with a pulse duration in the micro- or nano-second range, for example, 10 fs to 1 millisecond, and operating at a frequency of 1064 nm (IR), 532 nm (Green), or 355 nm (UV). The laser beam is guided by total inter reflection at the water/air interface, in a manner similar to conventional glass fibers, to a disk of super hard material, such as Cubic Boron Nitride (CBN), Polycrystalline Diamonds (PCD), tungsten carbide (WC), and the like. Laser MicroJet® technology has a long working distance (>100 mm).

It has been found that using a 60 μm nozzle and cutting in a spiral pattern caused the laser to penetrate through the sacrificial rod 40. However, using the laser to cut in a circular pattern provided the unexpected results of producing secondary coolant passages 30 without penetrating through the sacrificial rod 40. In addition, the time required to produce the secondary coolant passage 30 was reduced to under 3 minutes, thereby reducing production costs.

Figure 14:
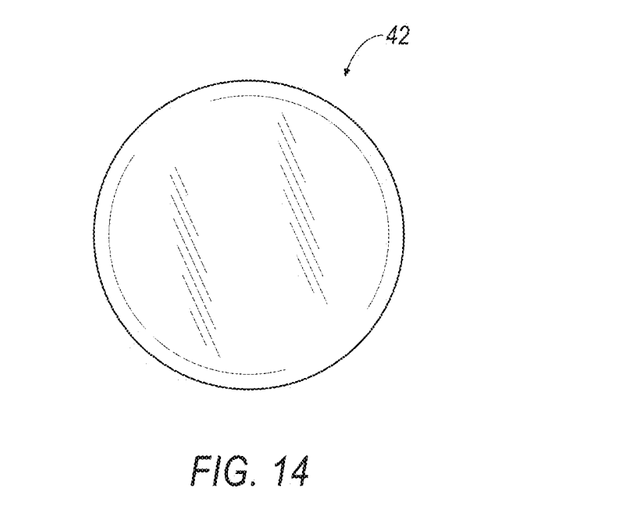
FIG. 14 is a top view of a slug produced by the laser technique of the invention.

FIG. 14 shows a slug 42 produced by cutting the secondary coolant passage 30 in a circular pattern. In one embodiment, the slug 42 has a diameter of between 5 microns and 10 mm. In other words, the secondary coolant passage 30 has diameter of between 5 microns and 10 mms. It has been found that the slug 42 can be ejected with water pressure during the laser beam manufacturing process.

Figure 15:
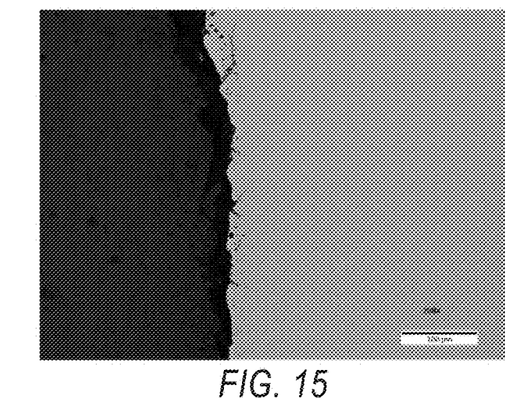
FIG. 15 is a photomicrograph at 200× optical power of a secondary coolant passage manufactured by a conventional EDM technique.
Figure 16:
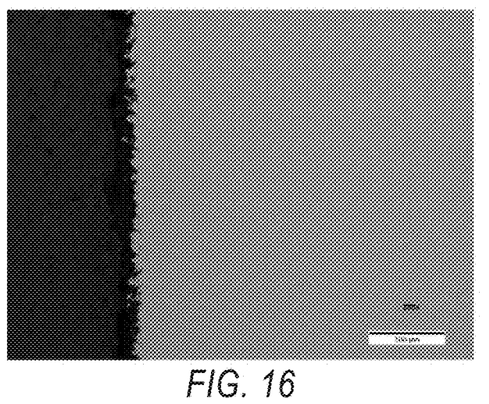
FIG. 16 is a photomicrograph at 200× optical power of a secondary coolant passage manufactured by the laser technique of the invention.

Several studies were conducted to compare the results of manufacturing the secondary coolant passages 30 using the laser technique of the invention with conventional techniques, such as EDM. FIGS. 15 and 16 show photomicrographs at 200× optical power of a coolant passage made using a conventional EDM and made with the laser technique of the invention, respectively. As clearly seen, the coolant passage manufactured with the EDM technique in FIG. 15 has much more undesirable damage to the material properties of the rotary cutting tool, as compared to the laser technique shown in FIG. 16.

Figure 17:
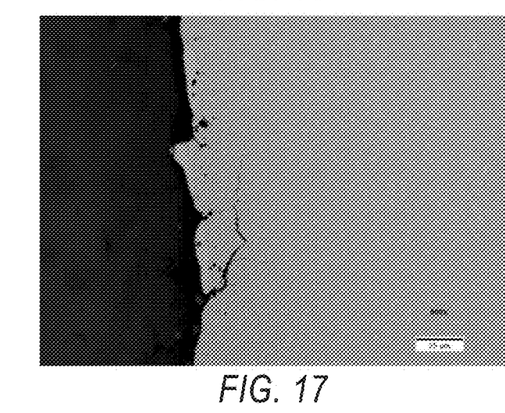
FIG. 17 is a photomicrograph at 500× optical power of a secondary coolant passage manufactured by a conventional EDM technique.
Figure 18:
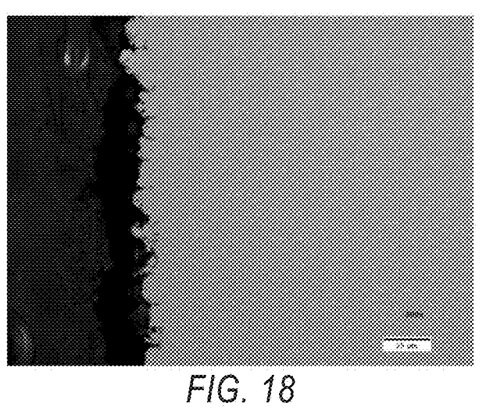
FIG. 18 is a photomicrograph at 500× optical power of a secondary coolant passage manufactured by the laser technique of the invention.

FIGS. 17 and 18 show photomicrographs at 500× optical power of a coolant passage made using a conventional EDM and made with the laser technique of the invention, respectively. As clearly seen, the coolant passage manufactured with the EDM technique in FIG. 17 has much more undesirable damage to the material properties of the rotary cutting tool, as compared to the laser technique shown in FIG. 18.

In summary, the use of the laser technique of the invention provided the unexpected results of producing secondary coolant holes with remarkably less undesirable damage to the material properties of the cutting tool, as compared to the conventional EDM cutting technique.

It should be appreciated that the rotary cutting tool 10, 10' described above is an exemplary embodiment of the invention, and that the principles of the invention of providing sufficient coolant to the cutting edge-chip interface by forming coolant passages using a laser technique (i.e., electro-magnetic radiation) can be applied to any rotary cutting tool suitable for use therewith.

The patents and publications referred to herein are hereby incorporated by reference.

Having described presently preferred embodiments the invention may be otherwise embodied within the scope of the appended claims.

What is claimed is:

1. A method of manufacturing a rotary cutting tool, the rotary cutting tool defining a central, longitudinal axis and comprising a shank portion, a cutting portion adjoining the shank portion, the shank portion has a shank end, the cutting portion has a cutting end opposite the shank end, one or more blades separated by a flute, and a main, internal coolant passage extending from the shank end through the shank portion and into the cutting portion, the method comprising:
   inserting a sacrificial rod into the main, internal coolant passage; and
   forming at least one secondary coolant passage in fluid communication with the main, internal coolant passage using electro-magnetic radiation,
   wherein the sacrificial rod prevents the electro-magnetic radiation from impinging on a surface of the main, internal coolant passage.

2. The method of claim 1, wherein the at least one secondary coolant passage is circular in cross-sectional shape.

3. The method of claim 1, wherein the at least one secondary coolant passage is non-circular in cross-sectional shape.

4. The method of claim 1, wherein the at least one secondary coolant passage is formed is formed at an angle, A2, with respect to the central, longitudinal axis of the rotary cutting tool.

5. The method of claim 4, wherein the angle, A2, is equal to 90 degrees.

6. The method of claim 4, wherein the angle, A2, is less than 90 degrees.

7. The method of claim 4, wherein the angle, A2, is greater than 90 degrees.

8. The method of claim 1, wherein the secondary coolant passage has a diameter of between 5 microns and 10 mm.

9. The method of claim 1, wherein the electro-magnetic radiation comprises a laser beam encased in a water jet.

10. The method of claim 1, wherein the electro-magnetic radiation has a non-Gaussian intensity profile.

11. A rotary cutting tool manufactured using the method of claim 1.

12. The rotary cutting tool of claim 11, wherein each blade has an end cutting edge and a peripheral cutting edge, the end cutting edge of each blade extending from an outer diameter of the cutting portion towards the central, longitudinal axis.

13. The rotary cutting tool of claim 11, wherein each secondary coolant passage has an exit aperture located in a respective flute.

14. The rotary cutting tool of claim 11, wherein the rotary cutting tool comprises a solid end mill.

15. The method of claim 1, wherein the sacrificial rod has a diameter less than a diameter of the main, internal coolant passage to enable the sacrificial rod to be easily inserted into and removed from the main, internal coolant passage of the rotary cutting tool.

16. The method of claim 1, wherein the sacrificial rod has a length greater than a length of the rotary cutting tool to enable the sacrificial rod to be easily inserted into and removed from the main, internal coolant passage of the rotary cutting tool.

17. The method of claim 1, wherein a plurality of secondary coolant passages are formed using electro-magnetic radiation.

18. The method of claim 17, wherein the plurality of secondary coolant passages are arranged in a circular array extending radially outward from the main, internal coolant passage.

19. The method of claim 17, wherein each secondary coolant passage is formed in a common plane that is substantially perpendicular to the central, longitudinal axis of the rotary cutting tool.

20. The method of claim 17, wherein at least one of the plurality of secondary coolant passages is formed at a first angle of less than 90 degrees with respect to the central, longitudinal axis of the rotary cutting tool, a second angle greater than 90 degrees with respect to the central, longitudinal axis of the rotary cutting tool, a third angle equal to 90 degrees with respect to the central, longitudinal axis of the rotary cutting tool, or any combination thereof.

* * * * *